United States Patent [19]

Chessmore et al.

[11] Patent Number: 4,948,568
[45] Date of Patent: Aug. 14, 1990

[54] METHOD AND APPARATUS FOR LIQUID FEED DISPERSION IN FLUID CATALYTIC CRACKING SYSTEMS

[75] Inventors: Donald O. Chessmore, Walnut Creek; Frederick A. Pettersen, Novato, both of Calif.

[73] Assignee: Chevron Research Company, San Francisco, Calif.

[21] Appl. No.: 289,323

[22] Filed: Dec. 23, 1988

Related U.S. Application Data

[60] Division of Ser. No. 813,152, Dec. 24, 1985, Pat. No. 4,793,913, which is a continuation of Ser. No. 640,110, Aug. 13, 1984, abandoned, Continuation-in-part of Ser. No. 464,121, Feb. 4, 1983, abandoned.

[51] Int. Cl.$^5$ ...................... C10G 11/00; F27B 15/08; F27B 15/00
[52] U.S. Cl. .................................... 422/140; 422/144; 422/224
[58] Field of Search .................. 422/140, 144, 224; 208/153, 157, 113

[56] References Cited

U.S. PATENT DOCUMENTS

| | | | |
|---|---|---|---|
| 2,747,936 | 5/1956 | Wahlin | 239/489 |
| 2,786,801 | 3/1957 | McKinley et al. | 422/140 |
| 2,994,659 | 8/1961 | Slyngstad et al. | 208/153 |

OTHER PUBLICATIONS

*Chemistry of Catalytic Process,* Gates et al, McGraw-Hill Book Company, 1978, p. 8.
Wang, Ikai, "High Temperature Catalytic Cracking," Ph. D. Dissertation in Fuel Engineering, Dept. of Mining, Metallurgical & Fuels Engineering University of Utah, Aug. 1974, pp. 40–44.

*Primary Examiner*—H. M. S. Sneed
*Assistant Examiner*—Chung K. Pak
*Attorney, Agent, or Firm*—Burns, Doane, Swecker & Mathis

[57] ABSTRACT

An improved liquid hydrocarbon feed method is disclosed wherein substantially all of the liquid is converted to mist sized particles over a wide angled dispersion pattern without a concurrent shroud of steam or water. Such dispersion promotes vapor phase catalytic reaction between hydrocarbon vapors and fluidized catalyst in a reaction time of 1 to 3 seconds. The misting nozzle is characterized by a swirl chamber to which the full hydrocarbon feed, with or without steam included in the feed, is supplied for centrifugal rotation by vane members to form a free vortex. The flow is then released through a reduced area square-edge orifice having a short throat to form and maintain a characteristic "vena contrata" from such an orifice during flow into the catalyst stream in the riser reactor for dispersion over a wide angled conical dispersion pattern. Such flow from the orifice allows the nozzle to be recessed out of the flowing catalyst stream. This keeps the nozzle cooler and minimizes mechanical erosion of the nozzle by the flowing, heated catalyst, without use of two phase nozzles to separately add steam or water. However, if desired steam may be used as a portion of the single fluid flow from the nozzle to reduce partial pressure of the vaporizing hydrocarbon feed. In a preferred form, the liquid feed is introduced into the transition section of a riser reactor.

6 Claims, 2 Drawing Sheets

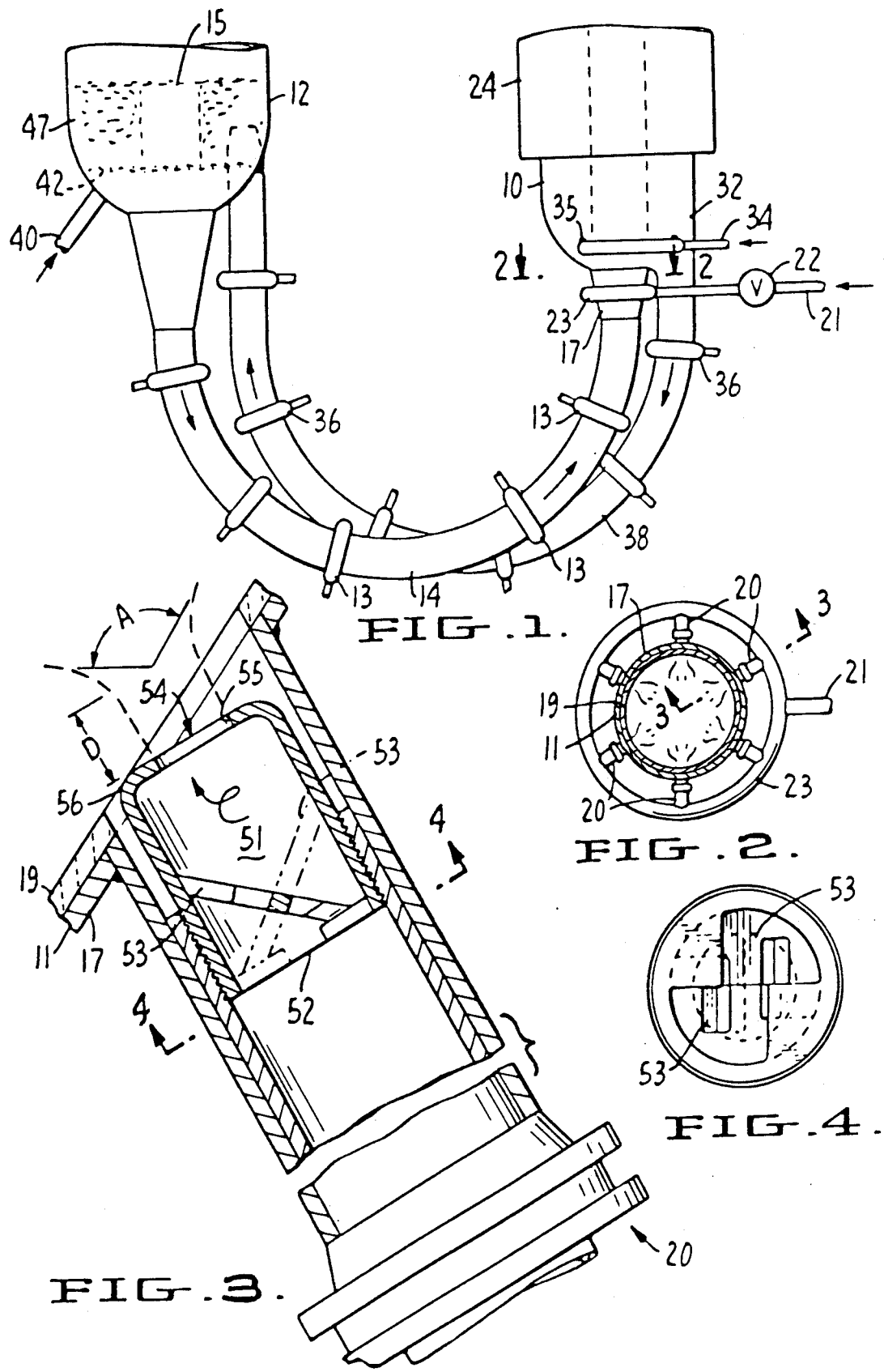

METHOD AND APPARATUS FOR LIQUID FEED DISPERSION IN FLUID CATALYTIC CRACKING SYSTEMS

This application is a division of application U.S. Ser. No. 813,152 filed Dec. 24, 1985, now U.S. Pat. No. 4,793,913, which is a continuation of application U.S. Ser. No. 640,110 filed Aug. 13, 1984, now abandoned, which is a continuation-in-part of application U.S. Ser. No. 464,121 filed Feb. 4, 1983, now abandoned.

FIELD OF THE INVENTION

The present invention relates to fluid catalytic cracking of hydrocarbons. More particularly it relates to an improved method of dispersing feed of liquid hydrocarbons into a stream of heated catalyst particles in a riser reactor to promote catalytic action between the hot catalyst particle surfaces and finely divided liquid drops.

It is a particular object of the invention to assure that finely divided hydrocarbon liquid drops directly contact hot catalyst particle surfaces rather than a liquid surface or gas evolving from liquid on the catalyst. Such contact between liquid drops and hot catalyst is promoted by disposing at least one mist generating hydrocarbon spray nozzle out of the catalyst flow path to discharge liquid feed into catalyst flowing in a riser reactor. In accordance with this invention, the misting nozzle includes a swirl or centrifugal chamber directly adjacent a sharp edge orifice having a full flow area which is substantially smaller than the area of the swirl chamber or the hydrocarbon liquid feed line connected to it. Desirably at least a pair of vanes, having a pitch of at least 2020 to the axes of the feed line and the chamber, initiate swirl or centrifugal rotation to create a free vortex in the flowing liquid as it passes through the chamber, and with no other obstruction to flow therethrough, except for the reduced diameter of a square or sharp edged orifice through which the entire feed passes into the riser Particular advantage is taken of the hydraulic phenomena of fluid flow through such a square or sharp edged orifice from a chamber of larger diameter. The result of such flow is the creation of a cylindrical flow of lesser diameter than the exit orifice, known as the "vena contracta". The reduction in diameter and the length of such vena contracta is dependent upon the velocity of the flowing stream. The reduction is diameter is on the order of 60% to 80% of the orifice diameter at useful flow rates, which depends upon the Reynolds numbers (a measure of turbulence) and viscosity of the fluid.

In a preferred form of the invention, the orifice area is preferably substantially equal to the cross-sectional area for flow through the vanes. Further, the orifice length or thickness is substantially less than the diameter so that the resulting vena contracta of fluid flowing out of the orifice at normal flow rates is sufficiently long to permit the nozzle to be recessed within the reactor riser sidewall without interfering with rapid dispersion or break up of the flow as a conical mist of liquid particles in the catalyst flow stream. Preferably, a plurality of such nozzles are equally spaced circumferentially around the riser reactor. Because the orifice discharge of the nozzles is out of the direct catalyst flow path, both erosion and direct heating of the nozzles by the hot catalyst stream is avoided. The resulting finely-divided feed droplets are rapidly vaporized from liquid to gas by direct contact with the heated catalyst particles. This favors catalytic reaction to mid-range liquid hydrocarbon vapors, rather than thermal decomposition of the hydrocarbons. Such catalytic reaction is favored because the catalyst-hydrocarbon interaction, particularly using zeolite-containing catalyst, is primarily a gas-phase cracking process. In contrast, a liquid-hydrocarbon and catalyst reaction is primarily thermal cracking which favors gas and coke production. Thus, more economically attractive mid-range (boiling point) hydrocarbons, pentanes and higher molecular weight liquids, are produced. Further such increase in desirable hydrocarbons is without significant increase in "coke" make on spent catalyst since the small droplets of feed are more fully vaporized for catalytic conversion and less liquid remains on the catalyst particles when they are separated from overhead vapor after discharge from the riser reactor.

BACKGROUND OF THE INVENTION

Description of the Prior Art

Fluidized catalytic cracking of heavy petroleum fractions is one of the major refining methods to convert crude or partially refined petroleum oil to useful products, such as fuels for internal combustion engines and heating oils. In such fluidized catalytic cracking, (know popularly as "FCC") high molecular weight hydrocarbon liquids are contacted with hot, finely divided solid catalyst particles in an elongated riser or transfer line reactor. The reactor is usually in the form of a riser tube and the contact time of the material is on the order of a few seconds, say one to ten seconds, and generally not over about three seconds. This short contact time is necessary to optimize generation of gasoline and middle distillate fractions. By proper selection of temperatures and reaction times the catalytic cracking reaction is "quenched" so that economically undesirable end products of such a reaction, methane and carbon, are held to a minimum, and yield of desired products, gasoline and middle distillate oils, is at a maximum. During this short reaction period a hydrocarbon feed stock, frequently in the form of vacuum gas oil, cycle oil or the like, at an initial temperature of from about 300° F. to 800° F., is sprayed onto catalyst at temperatures in the range of about 1100° F. to 1400° F. The present invention, as noted above is particularly directed to a system of uniformly misting such feed onto the hot catalyst.

Generally the mixture is fluidized partially by steam, but primarily by hydrocarbon gases that evolve by the hydrocarbonaceous feed vaporizing upon contact with the hot catalyst. Reaction of the mixture is one of essentially instantaneous generation of large volumes of gaseous hydrocarbons. The hydrocarbon vapors and catalyst mixture flow out of the riser tube into a separator or disengaging vessel. The spent catalyst is separated, primarily by gravity and inertia forces acting on the catalyst in the separator vessel, and passed downwardly through a stripper section for return to a regenerator. Fluidizing steam also generally flows up through the down-flowing catalyst to assist in stripping hydrocarbon vapor from the spent catalyst. Heat for the process is obtained by burning the coke, primarily carbon, on the spent catalyst by flowing oxygen through a bed of spent catalyst in a regenerator vessel. The regenerated and heated catalyst is then recirculated to the riser reactor. The desired product, hydrocarbon vapor, is recovered overhead from the separator vessel. Generally, This recovery is through one or more cyclone separators connected to a plenum chamber or common piping and directly piped to a distillation column. Vapor flow through the cyclone separators extracts residual or entrained catalyst fines. The catalyst fines are recovered from the cyclone separators through "dip legs" connected to the spent catalyst stripper, at the bottom or below the disengaging vessel, for return to the regenerator.

A particular problem in the initial generation of hydrocarbon vapor is that if the hydrocarbon liquid does not directly contact catalyst upon injection into the reactor riser, thermal cracking appears to be favored over the catalytic reaction. Such thermal cracking tends to generate end products of methane and coke. That is, complete conversion of hydrocarbons in the feed produces gas and coke, rather than desired middle distillate hydrocarbons. Prolonged contact of the unvaporized liquid hydrocarbons with catalyst after discharge into a separation vessel may result in further thermal cracking which tends to favor such end reactions particularly at high velocities. Further, it is essential to such catalytic cracking that hydrocarbon vapor contacts the catalyst because such reaction is primarily a vapor phase reaction.

While it has been proposed heretofore to use misting or fine droplet nozzles in the riser reactor pipe, in general such fine dispersions have been obtained by the use of steam or other vaporizing materials which form a two phase fluid. A particular problem with such two-phase fluids is that in general they produce a higher pressure drop through the spray nozzles than either fluid phase alone. This is important because pressure drop across the nozzle unit for a given size nozzle and a given rate of feed has a significant influence on the size of droplets that can be formed by the nozzle. It is of course also undesirable to add additional steam to the hydrocarbon feed. Such added steam must be recovered in the overhead distillation column and generally creates a "sour" water disposal problem, because oxides of sulfur, nitrogen, and carbon in the recovered hydrocarbon vapors combine with the water to form acids. In spite of such problems, steam has been used heretofore primarily because it reduces the hydrocarbon partial pressure and accordingly reduces resistance to vaporization of the feed stream by the catalyst.

U.S. Pat. Nos. 3,152,065 - Sharp et al, 3,812,029 - Snyder, 3,654,140 - Griffel et al, and 3,071,540 - McMahon et al are examples of feed nozzles for fluid catalytic cracking systems in which steam or water is concurrently injected with the hydrocarbon feed through an annular area surrounding the hydrocarbon feed nozzle. These patents indicate the advantages of using a "shroud" of steam around or within a nozzle disposed directly in the riser reactor for spraying hydrocarbon feed into the catalyst flow stream.

In Sharp et al, the feed is swirled by spiral vanes positioned around a straight flow pipe carrying steam into a liquid-steam mixing chamber. Release of the mixture from the chamber is through a sharp or square-edged orifice which is only slightly larger in diameter than the steam tube diameter. This is said to form a annular wall of liquid material, with misting of the hydrocarbon feed resulting from the steam forming a hollow conical spray of liquid that has its genesis at the free end, or orifice, of the nozzle. The nozzle is positioned directly in the catalyst flow stream. Additionally, the patentees disclose flow of steam to which centrifugal action is also imparted around the heated feed flow as well as the inner steam flow pipe.

The Snyder et al patent discloses hydrocarbon feed flowing through a surrounding water nozzle which concurrently cools the feed nozzle to prevent coking and disperses the mixture of water and feed into finer droplets.

Griffel et al disclose the use of a venturi in the supply line to disperse the feed. The nozzle is disposed within the riser reactor for combined steam and hydrocarbon feed flow. Alternatively, the patents disclose a spiral member in the hydrocarbon feed nozzle itself to impart a centrifugal component to the feed which is released through a straight tube. A surrounding flow of steam induces breakup of the flowing hydrocarbon feed to droplets.

In the arrangement shown by McMahon et al, steam and hydrocarbon liquid are fed concentrically through a nozzle arrangement. This is similar to apparatus disclosed by Snyder for concurrent water and hydrocarbon liquid. The concentric nozzles are positioned in the center of the riser reactor with annular flow of catalyst particles around the nozzles.

U.S. Pat. No. 4,097,243 - Bartholic - discloses a hydrocarbon feed distributor in which a divergent conical header supplies a center nozzle and a plurality of surrounding divergent nozzles. The feed distributor or header is disposed in the center of a riser reactor with catalyst flow around the nozzle.

U.S. Pat. No. 3,848,811 - Fryback - discloses a fluid discharge nozzle for injecting hydrocarbon feed into a riser reactor as a plurality of discreet concentric streams. A plurality of circumferentially spaced holes diverge outwardly relative to the direction of flow through the nozzle, as do a pair of frusto-conical members arranged in line with the direction of flow. One of the frusto-conical members includes additional port members so that in general feed is sprayed from a multiplicity of nozzles all directed generally outwardly and upwardly from the nozzle into the riser pipe. The nozzle is positioned in the center of the riser reactor to contact catalyst flowing downwardly over the nozzle, with steam flowing upwardly with catalyst around the nozzle.

U.S. Pat. No. 2,786,801 - McKinley et al - discloses an arrangement for spraying hydrocarbon feed into fluidized catalyst from a nozzle within a shroud positioned directly in the bed or stream. Catalyst flow is either upward or downward relative to the shroud. The nozzle arrangements include systems for (1) spraying liquid only, or liquid and gas either (2) separately or (3) combined. However, each nozzle includes a tapered throat leading either to a tube or conical discharge opening. The conical discharge opening either converges, or diverges as a venturi from the tapered throat. The patentees indicate that the only requirement is that the nozzle be encompassed within a shroud. The patent also suggests that a shroud having the nozzle inside, may be located on the wall of the reactor tube.

U.S. Pat. No. 2,937,988 - Polack - discloses a system for feeding oil and steam separately through concentric nozzles disposed in or directly above an annular flow diverter in the steam of solid particles. The steam nozzle may be omitted, but where used it is indicated to pass the steam transversely across the oil flow, thus shearing and atomizing the oil. The arrangement is directed to preventing direct contact of the feed with side walls of the reactor or transfer line.

U.S. Pat. No. 2,698,284 - Adams - discloses adding water to a residuum feed stream to assist dispersion in a coking operation in a levitated bed of coke, sand or the like. A spray nozzle is positioned in the center of the reactor and within the bed.

U.S. Pat. No. 2,994,659 - Slyngstad et al - discloses in FIG. 3 combining steam with hydrocarbon feed to a fluid catalytic cracking system through a nozzle within a reactor tube. However, the liquid-steam feed nozzle is surrounded by an annular nozzle carrying steam. Additionally, fluffing steam is injected around the annular steam nozzle.

None of the foregoing patents discloses a hydrocarbon feed system wherein a single fluid stream, with or without steam included therein, is misted into a flowing stream of fluidized catalyst particles by generating a free vortex in a single fluid hydrocarbon stream by passing it through a centrifugal acceleration chamber, including vanes, and then releasing the full flow through a sharp or square-edge discharge orifice recessed sufficiently within the reactor side wall so that the discharge orifice itself is out of the stream of fluidized catalyst, but so positioned that the vena contracta of fluid flowing from the orifice is sufficiently close to maintain its solid liquid flow form into the catalyst stream. Such location of the nozzle orifice in the side wall assures that the liquid stream breaks up into a fine mist over a conical pattern well within the catalyst stream. Such mounting assures that the outer surface of the nozzle is not coked by the feed or abraded (with eventual destruction of the metal nozzle) by high velocity catalyst particles made of exceedingly abrasive compounds, such as alumina and/or silica.

BRIEF SUMMARY OF THE INVENTION

As distinguished from the nozzles for feeding hydrocarbon fluids into a riser pipe shown in the above noted patents, it is a particular object of the present invention to assure that substantially all hydraulic energy of the hydrocarbon feed is used in a single flow passage to disperse the feed stream into mist size droplets without two phase pressure drop through the nozzle or requiring concurrent flow of streams of steam or water through a nozzle having single or multiple flow passages. Such droplet size permits almost instantaneous vaporization of the liquid hydrocarbon droplets by the hot catalyst particles in the riser so that gas phase catalytic reactions are produced, which favor primarily cracking to middle distillate, or low boiling point hydrocarbon liquids. In accordance with the present invention it has been found that such misting of a single feed stream may be accomplished by passing the full liquid stream, with or without included steam, through deflection vanes to create a free vortex in a single full-flow centrifugal or helical acceleration chamber which terminates in a sharp or square-edged orifice. Such orifice is substantially smaller is diameter than the fluid supply line for feeding the liquid hydrocarbons directly into the catalyst flow stream in the riser reactor. Such an arrangement of centrifugal chamber and orifice is particularly effective for dispersing the hydrocarbon feed into mist size droplets. To increase further both diffusion and the spray angle of the misted particles into the catalyst, the area of the orifice opening is made substantially equal to the cross-sectional area across the vanes the create the free vortex, or helical flow. Both are substantially smaller than the cross-sectional area of the supply stream line and the centrifugal or helical acceleration chamber. The vane members for inducing such helical or centrifugal rotation of the stream prior to release through reduced area orifice are disposed at a shallow angle of less than about 30 degrees to the flow axis to create as little pressure drop as possible in the feed line and through the square-edged orifice.

In a preferred form, the cylindrical or helical swirl chamber and the exit orifice are axially aligned with the hydrocarbon feed line so that little pressure drop is experienced by fluid flowing through the nozzle. Desirably, the orifice exit throat is substantially shorter than the length of the centrifugal swirl chamber. Thus, substantially all hydraulic energy in the free vortex of the released fluid, after flowing through the reduced area of the vena contracta created by the orifice, is converted to disperse or mist the fluid into droplets.

The open areas through the swirl vanes and the square-edge orifice are particularly advantageous over previously known feed nozzle arrangements. Plugging problems in the nozzle are minimized, because the nozzle may be recessed within the wall of the riser reactor so that it is not directly heated by conduction from the hot catalyst flowing over it; at the same time, the nozzle is not in the catalyst stream so that it interferes with the misting or break-up pattern produced by the orifice. Further, breakup of the fluid stream occurs well within the riser pipe and the catalyst stream. Additionally, by avoiding abrasion and destruction of the nozzle, prolonged runs of the fluid catalytic cracking system is made possible. In a preferred form of the invention a plurality of nozzles are equally distributed around the circumference of a transition section of the riser reactor where the flow area increases to accommodate higher flow rates of the mixture of catalyst and vaporized hydrocarbonaceous material.

Further objects and advantages of the present invention will become apparent from the following detailed description taken in conjunction with the accompanying drawings which form an integral part of the present specification.

BRIEF DESCRIPTION OF THE DRAWINGS

FIG. 1 is an elevation view of a lower portion of a fluid catalytic cracking system to which the feed nozzle system of the present has been applied and generally indicates a riser reactor to which heated catalyst is supplied from a regenerator and the return line for spent catalyst flowing from the separator vessel back to the regenerator.

FIG. 2 is a cross-sectional view taken in the direction of arrows 2-2 in FIG. 1 which illustrates an arrangement of a plurality of feed nozzles constructed in accordance with the present invention for flowing hydrocarbon feed from a circular header to a plurality of misting nozzles distributed around a riser reactor.

FIG. 3 is a cross-section view of one suitable form of nozzle constructed in accordance with the invention for assuring full flow of hydrocarbon feed as a mist into the riser reactor from within the side wall of the fluidized catalyst flow line, taken in the direction of arrows 3-3 through one of the nozzles shown in FIG. 2.

FIG. 4 is a cross sectional view taken in the direction of arrows 4-4 in FIG. 3 particularly illustrating the vane members inducing centrifugal or helical motion to create a free vortex flow of the hydrocarbon feed as it enters the centrifugal chamber and which directly supplies feed to catalyst through the reduced diameter, square-edge orifice of the nozzle.

DESCRIPTION OF PREFERRED EMBODIMENTS OF THE INVENTION

Figure 6:
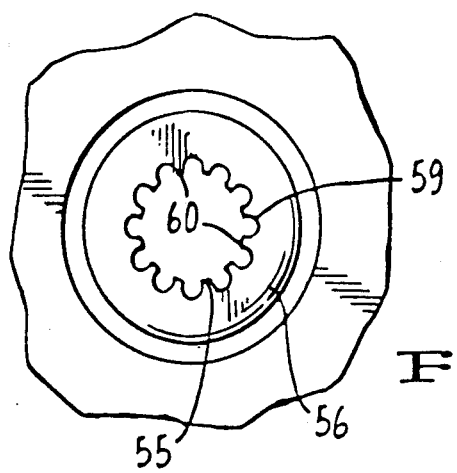
FIG. 6 is an end elevation view of the orifice of the nozzle of FIG. 5 illustrating a square-edge orifice having an undulating peripheral throat to form an alternate distribution pattern of liquid particles after passage through the reduced area of the vena contracta resulting from flow through such orifice.
Figure 5:
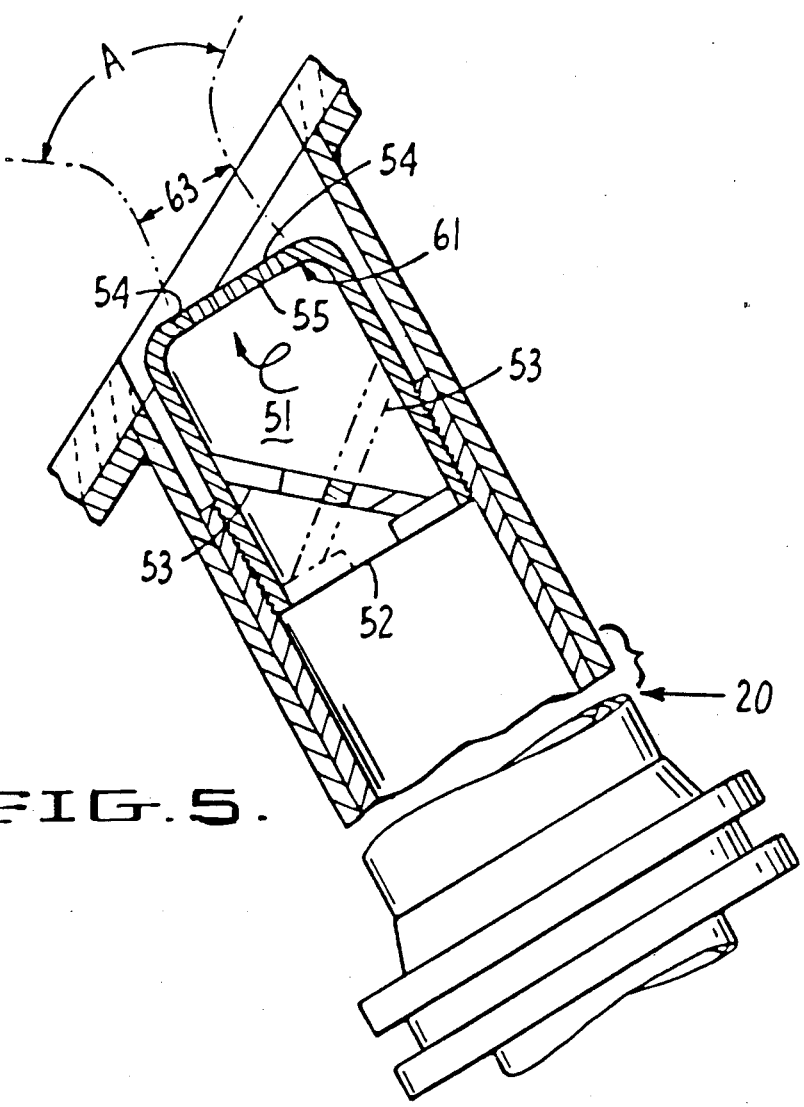
FIG. 5 is a cross-sectional view, similar to FIG. 3, of an alternate form of nozzle suitable for practice of the present invention.

Referring now to the drawings and in particular FIG. 1, there is shown a portion of a fluidized catalytic cracking unit to which the present invention has been applied. The system generally comprises a riser pipe 10 in which heated catalyst, supplied form regenerator 12 is reacted with liquid hydrocarbons. Catalyst flows regenerator 12 to pipe 10 through U-tube 14. Catalyst is partially fluidized in U-tube 14 by gas, preferably steam, supplied by a series of nozzle rings 13 along the length of U-tube 14. The steam entrains and partially fluidizes catalyst particles supplied by gravity from intake 15 in regenerator 12 and conveys them to riser pipe 10.

A stream of hydrocarbon liquid is supplied to riser pipe 10 by line 21 under control of valve 22. As indicated in FIG. 2, line 21 may supply a ring of feed nozzles 20 connected to a annular header 23. Because the catalyst particles are on the order of 20 to 120 microns in diameter it is important that liquid feed from line 21 and header 23 be as evenly distributed as possible and in proper droplet size for intimate contact and substantially instantaneous vaporization of the liquid droplets. This is essential because the vapor-phase catalytic reaction time to generate desired low boiling range liquids by contact between hot catalyst particles and hydrocarbon liquid droplets is on the order of 1 to 10 seconds; more properly, a reaction time range or 1 to 3 seconds and frequently about 1 second, is required for optimum catalytic reaction to generate middle distillate hydrocarbons rather than to form gas and coke.

Substantially instantaneous reaction of misted hydrocarbon droplets with heated catalyst particles generates large volumes of hydrocarbon vapor which primarily fluidize and carry the mixture upwardly in reactor 10 for prompt discharge and separation in separator vessel 24. The reacted hydrocarbon vapor and catalyst are separated in the upper portion of vessel 24 in the manner described in copending applications U.S. Ser. No. 238,380, filed Feb. 26, 1981, now abandoned, Ser. Nos. 335,458, Filed Dec. 29, 1981 now U.S. Pat. No. 4,414,200 and 363,946, Filed Mar. 31, 1982, now abandoned, assigned to the assignee of present application. The disclosures of said applications, relating to the overall structures and arrangements of suitable fluid catalytic cracking systems to which the present invention may be applied, and particularly the misting feed nozzle system herein disclosed and claimed, is incorporated by reference thereto. As disclosed in said applications, the catalyst is released or discharged from riser 10 and by inertia and gravity effects the catalyst is separated from the vapor. The spent catalyst is recovered in a stripping section, indicated as 32, at or in the lower end of vessel 24. The generated vapor is recovered overhead and condensed in a distillation column (not shown).

Catalyst recovered in the separation process contains a certain amount of residual hydrocarbons in the form of coke, primarily carbon, adhering to the spent catalyst. Such carbon, or coke, laden spent catalyst is returned to regenerator 12 through stripper means 32. Residual hydrocarbon vapor is removed from the spent catalyst in stripper 32 by introduction of steam, such as by line 34, feeding nozzles 35 at the lower end of stripper 32. Stripper 32 generally includes a plurality of baffles or sheds (not shown) to prolong residence time of the spent catalyst therein. Catalyst is assisted in returning to regenerator 12 by introduction of steam through a series of nozzle rings 36 along return U-tube 38. Spent catalyst is regenerated by addition of oxygen, as by line 40, to burn residual coke, from the catalyst particles supported for oxidation on grid 42. This supplies heat to the catalyst that circulates in the system and returns to riser 10 from bed 47 through intake 15. Off-gas from the burned coke is vented from regenerator 12 through cyclones and a flue pipe (not shown).

As noted above, the present invention is particularly concerned with a method of vaporizing the liquid hydrocarbon feed as rapidly as possible in riser reactor 10 so that the essential reaction of vaporized hydrocarbons in gas-phase with the catalyst particles, may proceed as the mixture flows through riser 10 in the allotted time of one to ten seconds, and most preferably in the range of one to three seconds.

For such short reaction times it is essential that all of the liquid feed be substantially instantaneously converted to gas to effect the necessary catalyst-gas phase reaction. Such reaction cracks the heavier hydrocarbon molecules to the desired middle boiling range hydrocarbons. To achieve such prompt gasification the flow pattern of the liquid feed into the fluidized catalyst stream must be uniform both as to droplet size and distribution at reasonable, commercially-available, flow rates and pressures. Further, nozzles for creating such patterned flow must be capable of extended service without plugging (as by formation of coke from the hot hydrocarbons flowing through it) or mechanical wear (as by abrasion of the fluidized catalyst particles).

While as noted above, it has been proposed heretofore to use steam or water as the primary dispersing fluid for atomizing the flow of hydrocarbon feed, we have found superior results, without addition of large volumes steam, can be obtained in accordance with our invention, by use of a nozzle having a single swirl chamber, acting as a helical or centrifugal acceleration compartment to form a free vortex between the full flow liquid feed line and a short reduced area sharp-edged orifice formed in the discharge end of the swirl chamber. For this purpose, as shown in FIG. 3, swirl or free vortex chamber 51 is substantially the same diameter as the full bore of flow nozzle 20. Preferably, nozzle 20 is recessed from the flow path of reactor riser 10, as in transition section 17, but only sufficiently deep in wall 11 and insulation-abrasion layer 19 to insure full flow of the liquid stream. As indicated, full flow output through orifice 54 is particularly well suited to this function because the fluid does not disperse until the break-up pattern is well within the catalyst flow path, as in transition section 17. As noted above, such action is provided by forming a free vortex in the fluid prior to entry into chamber 51 and by releasing such free vortex through a short, square-or sharp edge orifice 54 to form the vena contracta, characteristic only of such an orifice, so that full fluid flow extends from the recessed position of the orifice 54 in the side wall through and into the interior of riser pipe 10. The pitch of vanes 53 to form such a free vortex, the size and length of chamber 51 relative to the diameter and the depth or length of orifice 54 are selected to control the angle of dispersion from nozzle 20 so that the break-up pattern beyond the vena contracta creates properly sized droplets within riser 10.

Further, to maintain a vena contracta of adequate length of say ½ to 2 inches, it is important to assure that virtually all hydraulic energy is available to the hydrocarbon feed through nozzle 20. Such energy is also important to generate the helical or centrifugal action creating a free vortex of the feed so that full break-up of the stream disperses it into a wide-angled, conical mist-like spray of droplets. For such a flow pattern, a single pair of deflection vanes 53 are disposed transverse and angled to the axis of flow through nozzle 20. Vanes 53, which generate the free vortex rotation, or helical motion, of liquid flowing therethrough, create such a pattern. These vanes may have a pitch of from 15° to 45° to the axis of the feed line and chamber 51. Preferably, the pitch angle is from 25° to 35°, and most preferably about 30°. With vanes 53 so angled, the two flow areas 52 may be made with a combined area substantially equal to the flow area of exit orifice 54. This permits full pressure of the feed line to be applied to rotation of the stream in chamber 51 and subsequent release of the liquid in the required pattern.

As indicated, swirl or centrifugal action is transverse and circular to the direction of flow and results in full rotation of the entire flow coming through the nozzle prior to exit through the reduced diameter of the throat of orifice 54.

While orifice 54 is shown as a single, circular or cylindrical opening, the area may include various other configurations such as serrations in the cylindrical surface 55 of end wall 56. Such structure is particularly illustrated in FIG. 5 and 6 wherein the circular orifice opening includes a generally sine-wave configuration 59 with the tops 60 of the wave form truncated to approach a square wave but maintaining a sharp edge for passage of fluid. The outlet area from chamber 61, defined by the inner surface of end wall 56, is substantially perpendicular to orifice 54 so that at the normal feed rates the square or sharp edge forms the desired reduced area of the vena contracta 63 in the feed stream. As indicated, orifice surface 55 is only long enough to form the vena contracta over a distance sufficient to permit orifice 54 to be recessed in the side wall of riser pipe 10, including the erosion resistant coating, without interferring with the desired wide-angle conical dispersion pattern within the riser reactor. In practice the angle "A" of the apex of such a conical or parabolic volume should be in excess of 90° and preferable about 120°, as indicated in FIG. 3.

As indicated in FIG. 2, nozzles 20 may be equally distributed around riser pipe 10. The number may be varied in accordance with the diameter and flow rate of catalyst therethrough and may vary from 1 to 2 to a multiplicity, such as 6 as shown in FIG. 2, or an even greater number, say 12 to 15. As shown, the angle of the nozzle axis is from 20° to 70° relative to the axis of the riser reactor, and more desirable be about 30° to 50°, to assist in dispersion of the particles in the direction of catalyst-hydrocarbon mixture flow.

While it is contemplated by the present invention that the entire feed will be a hydrocarbon liquid, it is also expected that steam may be added directly to the feed liquid for the purpose of reducing the partial pressure of hydrocarbon liquid after it enters riser pipe 10. However, it is essential that such steam and hydrocarbon be mixed before the fluid is introduced into nozzle 20 and the mixture rotated together to form a free vortex in chamber 51 for proper dispersion of the feed after transmission into catalyst in riser pipe 10 through the vena contracta formed by orifice 54. This assures minimum pressure drop through the nozzle so that the mixture will not significantly decrease the full flow at the highest available hydraulic pressure to atomize the hydrocarbon feed into liquid droplets of the desired fineness after break up of the stream from orifice 54. In this way, the desired mist is formed in the riser to vaporize that such droplets immediately and completely upon contact with the heated catalyst particles.

As noted before, the use of excess steam in the initial reaction of hydrocarbon fluids with the catalyst is generally undesirable in fluid catalytic cracking. This is because such excess steam passes overhead with the vapor recovered from vessel 24 and must be treated with the condensed hydrocarbon product. Such condensation results in a "sour" water disposal problem since any water soluble materials, and particularly oxides of sulfur, nitrogen and carbon, in the condensate result in acidic water. Recovery and disposal of "sour water" in the condensate results in loss of efficiency of the conversion process and is an added cost in operating the system.

As used herein, it is contemplated that catalyst particles will be heated to a temperature of from 1000° F. to 1400° F. and preferably at a temperature of about 1200° F. to 1300° F. While the present system will produce nearly instantaneous misting and vaporization at higher temperatures, say up to 1500°, commercial catalytic cracking systems capable of such high temperature operation are not yet common. However, the present invention is particularly suitable for such high temperature operation, because in general, full flow of the hydrocarbon fluid is preserved under what otherwise might be coking conditions in the nozzle. Such coking is particularly to be avoided to maintain high flow rates through the nozzles. Accordingly, problems of coking, avoided in prior art devices by use of a steam shroud in a surrounding atmosphere or vice-versa, are solved by the present invention by positioning the nozzles out of the catalyst flow stream without loss of dispersion of the hydrocarbon feed into mist-like droplets.

In modern forms of fluid catalytic cracking, typical catalyst includes a combination of amorphous materials together with crystalline materials, such as molecular sieves. The predominant components of such cracking catalyst are silica and alumina in weight ratios of from about 10% to about 60% alumina in silica. Various combinations of rare earth elements may also be present. Silica-magnesia and other mixed oxide catalyst may also be used. The catalyst used may include particles having a wide range of free settling rates. Commercially available, powdered cracking catalyst have a particle size distribution from 60–90 weight % in the range of 20–120 microns.

A particular advantage of fluidized catalytic cracking is that a wide range of hydrocarbon feedstocks may be processed in such a method. These may include virgin petroleum distillates, residual petroleum fractions, deasphalted oils, hydrocarbon oil and mixtures thereof. Other heavy petroleum hydrocarbon fractions, that is, those having boiling points of 600° F. and heavier, may be advantageously converted to lower boiling, more valuable, hydrocarbon products. In such a reaction, the temperature of the feedstock in general will be from ambient temperatures to from 350° F. or 400° F. While the feed may be vaporized before release into the stream of hot regenerated catalyst particles flowing in the riser reactor, in general it is economically preferable to vaporize the hydrocarbon primarily by contact with the hot catalyst. A wide range of catalyst to oil feed/weight ratios may be used by preferably the catalyst/oil feed weight ratio is from about 2:1 to about 20:1 with a range of hydrocarbon/catalyst contact times in the range of 1 to about 10 seconds, and most preferably from 1 to 3 seconds.

The full reasons that the present arrangement of a cylindrical swirl chamber and an orifice having both a reduced diameter and a short throat area is so effective in vaporizing the feed in the desired pattern is not fully understood. However, it is believed that the misting action of the nozzle is achieved by virtue of fluid passing from axial flow to circular or centrifugal flow by passage through turning vanes imposing a small pressure drop and having a flow area about equal to the orifice area. Thus, passage of the full feed from the swirl chamber is in the form of a free vortex through a short square-edged orifice which forms a short cylindrical flow section (vena contracta) and then expands over a wide-angled conical section. This pattern is not only effective to create properly sized droplets for rapid conversion to gas by the catalyst but most importantly permits recessing the nozzle in the riser side wall to avoid both catalyst abrasion and direct heating by the hot catalyst. Because of the rapid expansion of the feed into finely divided particles over a wide angle conical pattern, a highly turbulent gas flow stream is created by the voluminous production of hydrocarbon vapor when the hot liquid droplets contacts the hot catalyst. Preferably flow from the nozzle orifice into the catalyst stream is at a point where the catalyst is slightly slowed by an increase in area from U-tube 14 into riser 10. Transition section 15 provides such an increasing cross-sectional area and aids in the sudden acceleration of the feed and catalyst mixture due to vapor evolution from hydrocarbons reacting with hot catalyst.

While the reason for such sudden and more complete evolution of desirable hydrocarbons is not fully understood, comparison of a commercial fluid catalytic cracking system using conventional nozzles, where no particular effort was made to obtain a misting spray, with a system of nozzles for vaporizing feed in accordance with the present invention is particularly impressive. The conditions of such changes in yield of hydrocarbon fluids from the improved hydrocracking system are illustrated in the following table.

TABLE 1

| Comparison of Yield Changes between Conventional (Old) and Mist Feed Nozzles | | | |
|---|---|---|---|
| Operating Conditions | Old | New | % change |
| Reactor Temp, °F. | 953 | 935 | −18 |
| Regen Temp, °F. | 1240 | 1235 | −5 |
| Catalyst/Oil | 6.0 | 5.9 | −0.1 |
| Conversion, LV % | | | |
| 430−° F. | 71.9 | 72.6 | +0.7 |
| 650−° F. | 89.6 | 91.3 | +1.7 |
| Yields | | | |
| $C_2^-$, wt % | 2.1 | 1.8 | −0.3 |
| $C_3^=$, LV % | 7.1 | 6.5 | −0.6 |
| $\Sigma C_3$, LV % | 9.2 | 8.2 | −1.0 |
| $C_4^=$, LV % | 7.5 | 7.3 | −0.2 |
| $\Sigma C_4$, LV % | 13.6 | 12.8 | −0.8 |
| $C_5$−430° F., LV % | 60.8 | 63.5 | +2.7 |
| 430°−650° F., LV % | 17.8 | 18.7 | +0.9 |

TABLE 1-continued

| Comparison of Yield Changes between Conventional (Old) and Mist Feed Nozzles | | | |
|---|---|---|---|
| Operating Conditions | Old | New | % change |
| 650° F.+, LV % | 10.4 | 8.7 | −1.7 |
| Coke, wt % | 4.0 | 3.9 | −0.1 |

From the foregoing Table 1 it will be seen that by use of nozzles in accordance with this invention, hydrocarbons of 4 carbon atoms or less as in butane, propane and ethane, are each reduced significantly. At the same time, those in the range from $C_5$ to those having boiling points of about 650° F. are substantially increased. It is also to be noted in this regard that heavier hydrocarbons, such as those from 650° F. up, which represent increased coke or coking of the catalyst, are similarly reduced. In a full commercial plant operation, based upon the above identified comparison, it may be shown that such incremental values of desired products, estimated to be more valuable at a rate of 25¢ per gallon, and obtained by using the nozzle arrangements of the present invention resulted in a $2500/per day profit improvement. On an annualized basis, this represents a net gain in value of products of from $750,000 to $900,000 per year.

While only a few embodiments of the present invention have been disclosed it will be apparent that the operating principals and structures disclosed will suggest to those skilled in the art various modifications and changes which can be made in the present invention without departing from the spirit thereof. All such modifications and changes coming within the scope of the appended claims are intended to be included therein.

We claim:

1. Apparatus for improving the rate of reaction of liquid hydrocarbons with a heated fluidized catalyst in a riser reactor of fluid catalytic hydrocarbon cracking system which includes at least one nozzle unit for spraying a feed of said liquid hydrocarbons into said riser reactor, which comprises:

means for recessing said nozzle unit within a wall of said reactor riser, said nozzle having a cylindrical swirl chamber positioned between a liquid hydrocarbon feed conduit and a discharge orifice from said chamber, said discharge orifice having a square edge to create a vena contracta of liquid flowing therethrough which is smaller in cross-sectional area than said orifice area, a plurality of stationary vane members between said feed line and said chamber for imparting centrifugal rotation to said liquid relative to the flow axis through said chamber and said orifice, said discharge orifice being smaller in diameter and substantially shorter in length than said swirl chamber, both said orifice and said chamber being open for full flow throughout the full cylindrical volumes thereof, and means for positioning said at least one nozzle unit in said recessing means so that said orifice is out of said riser reactor but said vena contracta of the fluid flowing therethrough extends into said riser reactor.

2. Apparatus in accordance with claim 1 wherein a plurality of said nozzle units are substantially uniformly distributed around the circumference of a transition section of said reactor.

3. Apparatus in accordance with claim 1 wherein said nozzle unit is disposed at an angle of from 20° to 70° relative to the axis of said riser reactor.

4. Apparatus in accordance with claim 1 wherein said stationary vanes have an angle to the axis of said chamber of from 15° to 45°.

5. Apparatus in accordance with claim 4 wherein said angle is from 25° to 35°.

6. Apparatus in accordance with claim 4 wherein said angle is from 15° to about 30°.

* * * * *